United States Patent
Gillis et al.

(10) Patent No.: US 11,259,181 B2
(45) Date of Patent: *Feb. 22, 2022

(54) BIOMETRIC GENERATE OF A ONE-TIME PASSWORD ("OTP") ON A SMARTWATCH

(71) Applicant: Bank of America Corporation, Charlotte, NC (US)

(72) Inventors: Trish Gillis, Chicago, IL (US); Patrick Burgess, Chicago, IL (US); Robert S. Mumma, Chicago, IL (US); Napangsiri Wanpen, New York, NY (US); Taylor Farris, Hoboken, NJ (US); Benjamin Blad, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 50 days.

This patent is subject to a terminal disclaimer.

(21) Appl. No.: 16/924,370

(22) Filed: Jul. 9, 2020

(65) Prior Publication Data
US 2022/0014916 A1     Jan. 13, 2022

(51) Int. Cl.
*H04W 12/06*     (2021.01)
*H04L 29/06*     (2006.01)
(Continued)

(52) U.S. Cl.
CPC ........ *H04W 12/068* (2021.01); *G06Q 20/382* (2013.01); *G06Q 20/385* (2013.01);
(Continued)

(58) Field of Classification Search
CPC ...... G06F 21/32; G06F 21/31; G06F 21/6245; G06F 21/34; H04L 63/0861;
(Continued)

(56) References Cited

U.S. PATENT DOCUMENTS 8,281,375 B2 * 10/2012 von Krogh ............... H04L 9/12
                                                          726/6
8,572,684 B1 * 10/2013 Sama .................... H04L 9/3228
                                                          726/2
(Continued)

FOREIGN PATENT DOCUMENTS

CN         109547196 A  *   3/2019

OTHER PUBLICATIONS

Alex Perala, "Apple Exploring Face ID for Apple Watch 4," https://mobileidworld.com/face-id-for-apple-watch-4-904233/, Mobile ID World, Apr. 24, 2018.
(Continued)

*Primary Examiner* — Saleh Najjar
*Assistant Examiner* — Khalid M Almaghayreh
(74) *Attorney, Agent, or Firm* — Weiss & Arons LLP

(57) ABSTRACT

One-time password ("OTP") generation on a smartwatch is provided. OTP generation may include communication between an application on a smartwatch and an application on a smartphone. The request for an OTP may be received at the smartwatch. A biometric identifier may also be received at the smartwatch. The smartwatch application may communicate with the smartphone application. An OTP may be generated within a third-party library within the smartphone application. The generated OTP may be transmitted from the smartphone application to the smartwatch application. The OTP may be displayed on the smartwatch.

21 Claims, 14 Drawing Sheets

(51) Int. Cl.
*G06Q 20/38* (2012.01)
*H04W 12/30* (2021.01)
*H04W 12/50* (2021.01)
*H04W 12/61* (2021.01)
*H04W 12/77* (2021.01)

(52) U.S. Cl.
CPC ......... *H04L 63/0838* (2013.01); *H04W 12/30* (2021.01); *H04W 12/50* (2021.01); *H04W 12/61* (2021.01); *H04W 12/77* (2021.01)

(58) Field of Classification Search
CPC ............ H04L 63/0838; H04W 12/068; H04W 12/50; H04W 12/77; H04W 12/61; H04W 12/30; G06Q 20/385; G06Q 20/382
See application file for complete search history.

(56) References Cited

U.S. PATENT DOCUMENTS

| | | | |
|---|---|---|---|
| 9,106,645 B1* | 8/2015 | Vadlamani | G06F 1/14 |
| 9,124,433 B2* | 9/2015 | Marien | H04L 9/3234 |
| 9,213,820 B2 | 12/2015 | Farraro | |
| 9,262,759 B2 | 2/2016 | Hanson et al. | |
| 9,294,476 B1* | 3/2016 | Lurey | H04L 63/0492 |
| 9,384,481 B2 | 7/2016 | Hanson et al. | |
| 9,589,123 B2 | 3/2017 | Farraro | |
| 9,646,300 B1 | 5/2017 | Zhou et al. | |
| 9,768,963 B2* | 9/2017 | Chu | H04L 9/3228 |
| 9,811,818 B1 | 11/2017 | Xing | |
| 9,830,589 B2 | 11/2017 | Xing | |
| 9,832,019 B2* | 11/2017 | Choi | G06F 21/33 |
| 9,871,785 B1* | 1/2018 | Triandopoulos | H04L 9/3213 |
| 9,906,524 B2 | 2/2018 | Shibata et al. | |
| 9,930,034 B2 | 3/2018 | Ekambaram et al. | |
| 10,122,719 B1* | 11/2018 | Vltavsky | H04L 63/083 |
| 10,587,613 B2 | 3/2020 | Ledesma | |
| 2009/0097459 A1* | 4/2009 | Jendbro | H04L 63/0838 370/338 |
| 2009/0300738 A1* | 12/2009 | Dewe | G06Q 20/4014 726/6 |
| 2011/0197266 A1* | 8/2011 | Chu | H04L 9/3228 726/5 |
| 2014/0351911 A1* | 11/2014 | Yang | H04L 63/0807 726/7 |
| 2016/0337346 A1* | 11/2016 | Momchilov | H04L 63/0272 |
| 2017/0032370 A1* | 2/2017 | Beltramino | G06Q 20/38215 |
| 2017/0083909 A1* | 3/2017 | Mork | G06Q 20/401 |
| 2017/0249628 A1* | 8/2017 | Douglas | G06Q 20/3672 |
| 2019/0174304 A1* | 6/2019 | Tunnell | H04W 12/50 |
| 2019/0303556 A1* | 10/2019 | Jain | G06F 21/445 |
| 2020/0074070 A1* | 3/2020 | Boodaei | G06F 21/33 |
| 2020/0128594 A1* | 4/2020 | Shantharam | H04W 48/16 |
| 2020/0404019 A1* | 12/2020 | Drake | H04W 12/02 |
| 2021/0073359 A1* | 3/2021 | Boodaei | G06F 21/46 |

OTHER PUBLICATIONS

Eric Weiss, "Apple Patent Could Bring Face ID to Apple Watch," https://mobileidworld.com/biometrics-news-apple-patent-could-bring-face-id-apple-watch-111906/, Mobile ID World, Nov. 19, 2019.

"Apple Patent Points to Face ID coming to Apple Watch along with Band Sensors to Analyze Sports Performance and More," https://www.patentlyapple.com/patentlyapple/2018/03/apple-patent-points-to-face-id-coming-to-apple-watch-along-with-bandsensors-to-analyze-sports-performance-and-more.html, Patently Apple, Jun. 9, 2020.

Benjamin Mayo, "Rumor: Apple Developing Touch ID fingertip Biometrics for Apple Watch, Series 2 will not Support WatchOS 7," https://9to5mac.com/2020/03/27/rumor-apple-developing-touch-id-fingerprint-biometrics-for-apple-watch-series-2-will-not-support-watchos-7/, Word Press.com VIP, Mar. 27, 2020.

* cited by examiner

TOKEN ACTION SCREEN

8 DIGIT CODE SCREEN
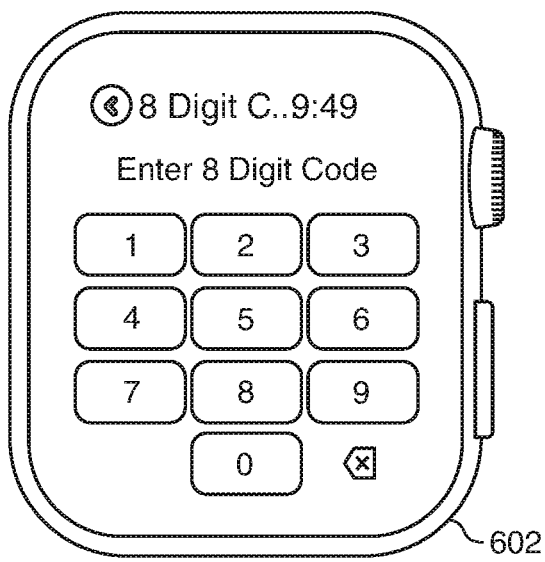
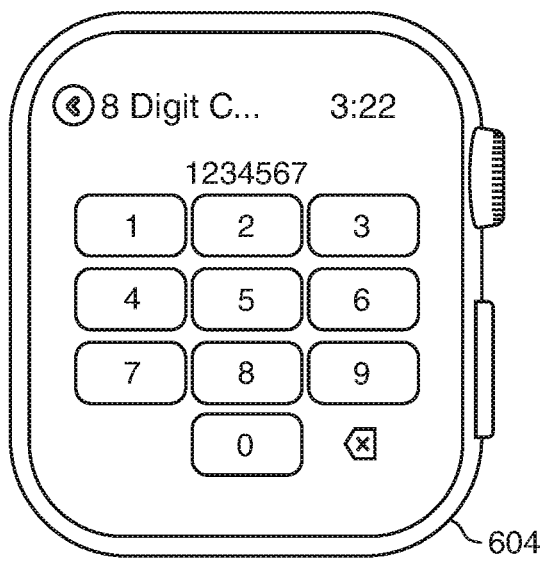
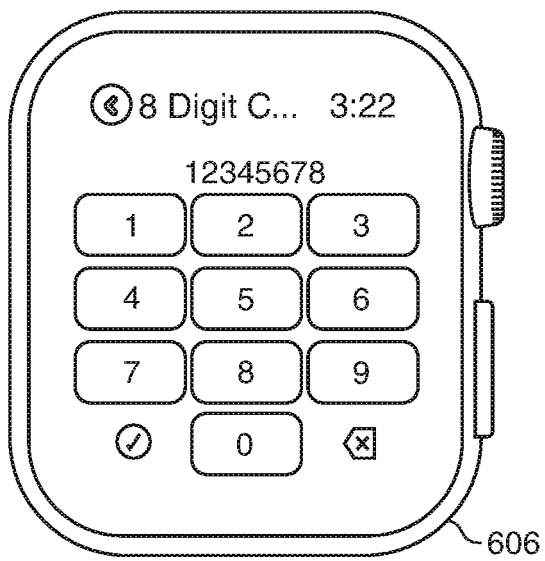
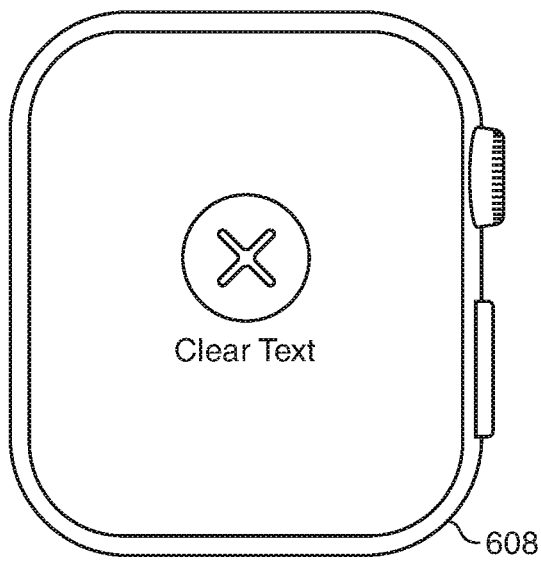
FIG. 6

CONTROL TOTAL SCREEN
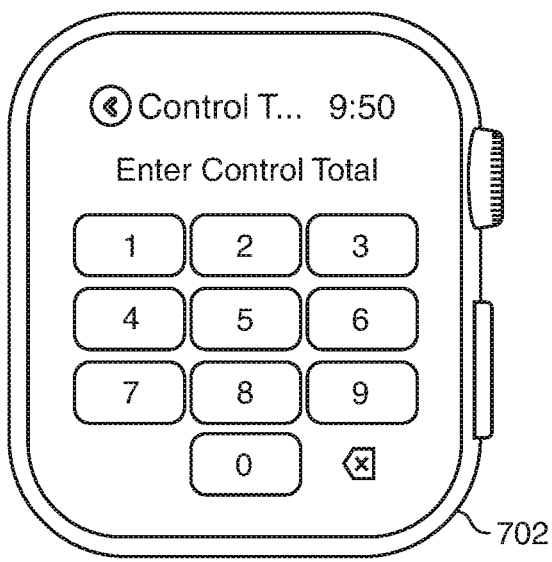
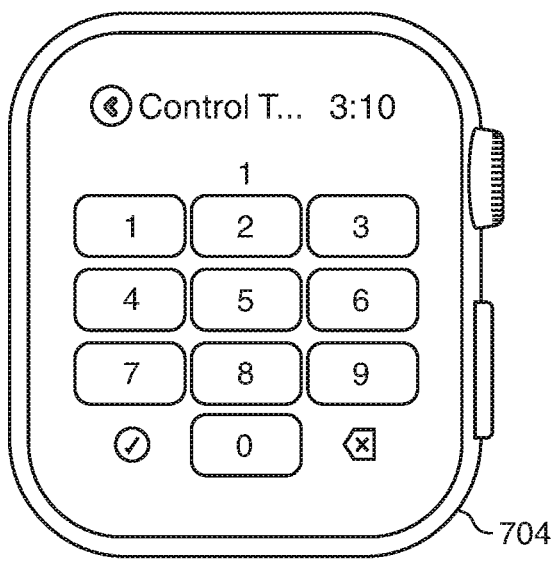
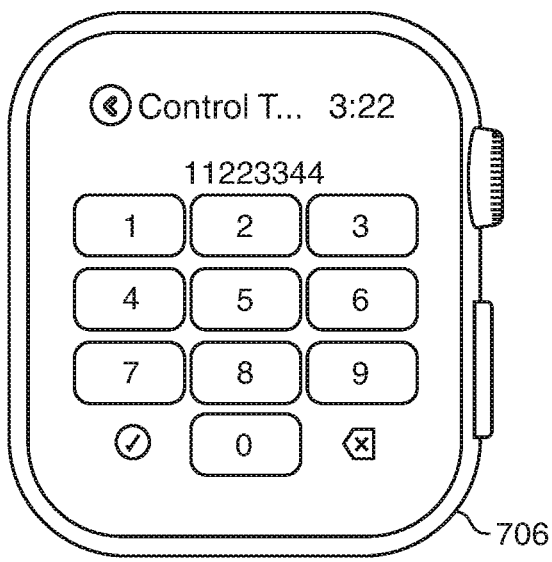
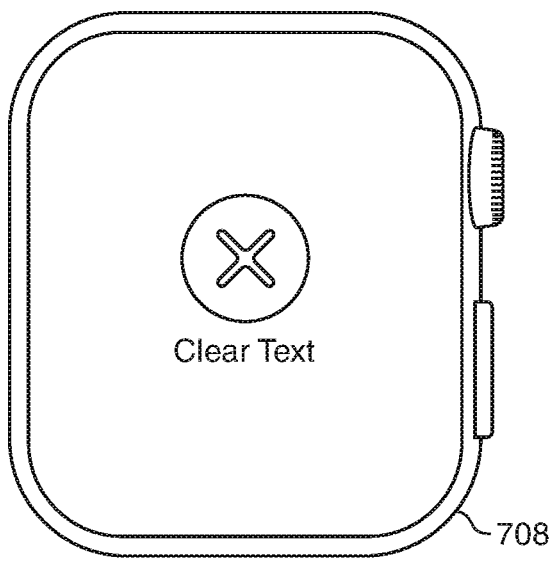
FIG. 7

VERIFY DATA

VALIDATING BIO ID...
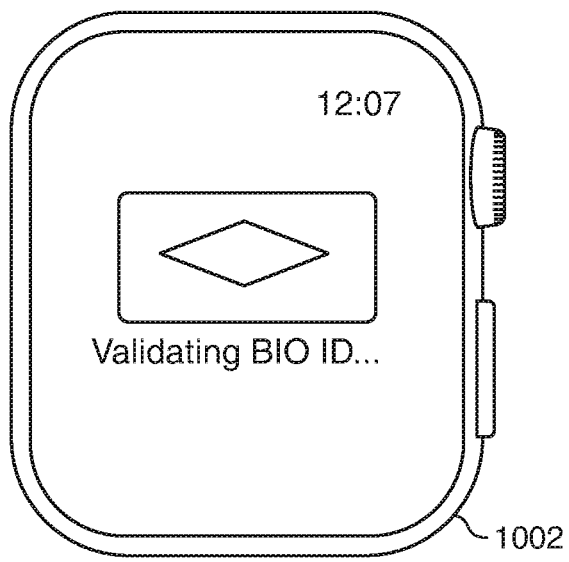
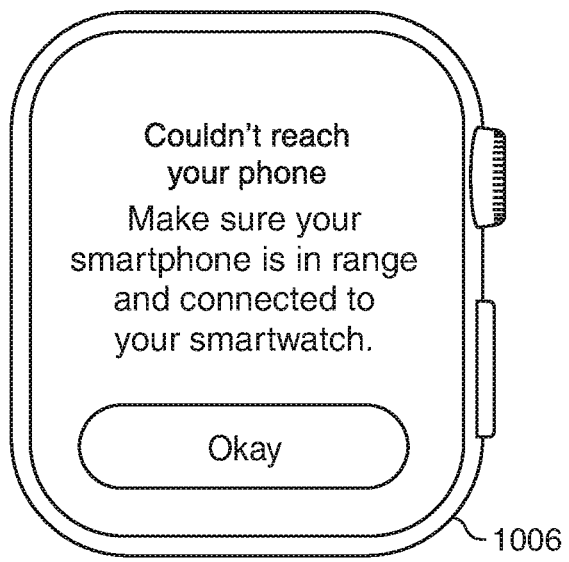
FIG. 10

ERROR MESSAGES — 1302

| Error Kind | Error Code |
|---|---|
| Session Delegate Error — 1304 | |
| Session Not Active | 5000 |
| Session Has Content Pending | 5001 |
| Device Not Reachable | 5002 |
| Unknown Session Error | 5555 |
| Token Error — 1306 | |
| Cannot Generate OTP | 9000 |
| Cannot read Phone Data | 9001 |
| BIO ID Validation Error | 9009 |
| Token List Modified Since Last Fetch | 9003 |
| Jailbroken smartphone | 9004 |
| No Passcode on Watch | 9005 |
| Unknown Token Error* | ???? |
| WatchKit Connectivity Error — 1308 | |
| Reply Message Took Too Long | 7012 |
| Payload Cannot Be Delivered | 7014 |
| Device Not Reachable | 7017 |

* An Unknown Token Error can include any 4-digit Error Code

FIG. 13

BIOMETRIC GENERATE OF A ONE-TIME PASSWORD ("OTP") ON A SMARTWATCH

FIELD OF TECHNOLOGY

This disclosure relates to smartwatch applications.

BACKGROUND OF THE DISCLOSURE

Entry into a computer application is usually secured by an authentication method. Relatively simple authentication methods require a user to enter a username and password. Upon entry of the username and password, the user may be allowed entry into the computer application.

More complicated authentication methods include two-factor authentication. Two-factor authentication requires a username and password as well as another form of authentication. The second factor of authentication may include entry of an additional data element after entering the username and password. The additional data element may be transmitted, substantially contemporaneously with the user authentication, to the user. Examples of data element transmission methods may be e-mail or phone. The data element may be a numerical code. Such a numerical code is typically called a one-time password ("OTP").

At times, it may be cumbersome to access e-mail or phone when logging into a computer application. It would be desirable to retrieve and/or generate an OTP without accessing a phone or e-mail account.

Recently, smartwatches have become more common. Smartwatches are computing devices worn on the wrist. Smartwatches may communicate with a smartphone. Smartwatches may be used to perform computing tasks without utilizing a smartphone.

It would be desirable be able to generate an OTP using a smartwatch. It would be further desirable for the smartwatch to communicate with a smartphone in order to retrieve and/or generate the OTP.

SUMMARY OF THE DISCLOSURE

A method for generating a one-time password ("OTP") on a smartwatch is provided. The smartwatch may be in communication with a smartphone. The method may include generating a request for a token list at a smartwatch application. The smartwatch application may be resident on the smartwatch.

The method may include transmitting the request for the token list of a secure wireless communication to a smartphone application. The smartphone application may be resident on a smartphone.

The method may include receive the request for the token list at the smartphone application.

The method may include using a third-party library to retrieve the token list from secure storage on the smartphone. The third-party library may be stored within the smartphone application.

The method may include transmitting the token list from the smartphone application to the smartwatch application. The transmission may be via secure wireless communication. The secure wireless communication may be BLUETOOTH®, WI-FI® or any other suitable secure wireless communication.

The method may include displaying the token list on the smartwatch. The method may include receiving, at the smartwatch application, a user selection of a token from the token list.

The method may include requesting, at the smartwatch application, entry of a biometric identifier. Such a biometric identifier may be a fingerprint, iris scan, face scan, other suitable biometric identifier or combination of biometric identifiers.

The smartwatch may include a biometric identification element. As such, an OTP may be generated upon receipt of the biometric identifier at the biometric identification element within watch. The biometric identifier may be a fingerprint, iris scan, face scan or any other suitable biometric identifier. The biometric identifier may be received at a biometric receiver within the smartwatch.

The biometric receiver may be hardware and/or software that is operable to authenticate one or more biometric identifiers. Such hardware may be integrated into the digital crown of a smartwatch. Such hardware may also be located underneath a screen of a smartwatch.

In addition, many smartwatches include a layer of titanium electrode. The layer of titanium electrode may cover the faceplate of the crown of the smartwatch. This layer of titanium electrode may enable an electrocardiogram feature of the smartwatch. As such, the biometric receiver may be compatible with the layer of titanium electrode and the electrocardiogram feature. In some embodiments, a biometric identifier sensor, such as a fingerprint sensor, may also be integrated into the digital crown of the smartwatch.

Upon receipt of the biometric identifier at the smartwatch application, the method may include transmitting an OTP request over the secure wireless communication to the smartphone application.

The method may include receiving the OTP request at the smartphone application. The method may include accessing the third-party library. The method may include generating the OTP within the third-party library located within the smartphone application. The method may include transmitting the generated OTP from the smartphone application to the smartwatch application. The transmission may be via the secure wireless communication.

The method may include displaying the generated OTP on the smartwatch.

In some embodiments, the OTP may expire after a predetermined amount of time after generation at the third-party library. The smartwatch may display a countdown of a number of seconds until the OTP will expire. The countdown until OTP expiration may take into account the transmission delay between the smartphone and the smartwatch. The countdown until OTP expiration may also take into account the transmission delay between the smartphone and the smartwatch and a static number of seconds.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 6 shows illustrative smartwatch screens in accordance with principles of the disclosure;

FIG. 7 shows illustrative smartwatch screens in accordance with principles of the disclosure;

FIG. 10 shows illustrative smartwatch screens in accordance with principles of the disclosure;

FIG. 13 shows an illustrative diagram in accordance with principles of the disclosure.

DETAILED DESCRIPTION OF THE DISCLOSURE

A method for generating an OTP on a smartwatch is provided. The smartwatch may be in communication with a smartphone.

The method may include generating a request for a token list at a smartwatch application. The smartwatch application may be associated with, and/or resident on, the smartwatch.

The method may include transmitting the request for the token list over a secure wireless communication to a smartphone application. The smartphone application may be associated with, and/or resident on, the smartphone.

The method may include receiving the request for the token list at the smartphone application. The method may include accessing the third-party library. The third-party library may retrieve the token out of secure storage. For the purposes of this application, a third-party library may include a random number generator. The method may include generating the OTP within the third-party library. The third-party library may be located within the smartphone application.

The method may include transmitting the generated OTP, via the secure wireless communication, from the smartphone application to the smartwatch application.

The method may include displaying the generated OTP on the smartwatch. The OTP may expire after a predetermined amount of time after generation at the third-party library. The smartwatch may display a countdown of a number of seconds until the OTP will expire. The countdown may be underneath, or, alternatively, on top of the OTP display. The countdown may take into account the transmission delay between the smartphone and the smartwatch. The countdown may include the transmission delay and a static amount of time. The amount of time may be a number of seconds.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
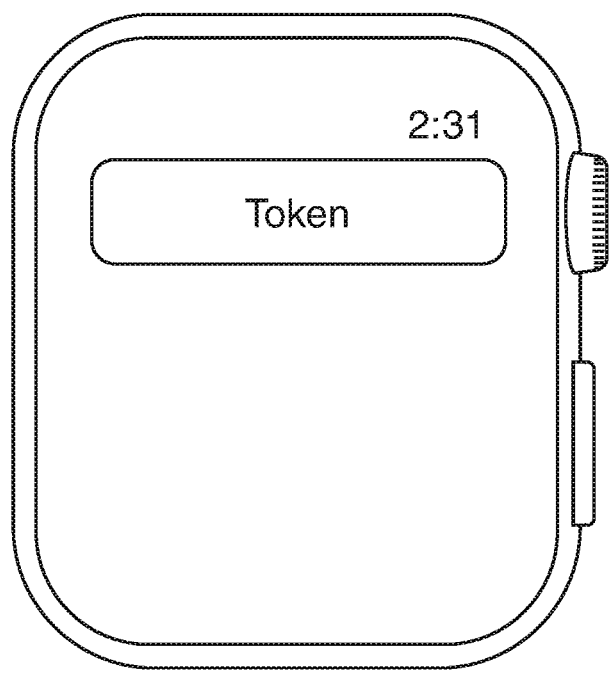
FIG. 1 shows an illustrative smartwatch screen in accordance with principles of the disclosure.

FIG. 1 shows an illustrative display of a smartwatch. A user of the smartwatch may open an OTP generation application. The OTP generation application may present the user with a token list. The token list may not be stored on the smartwatch. The token list may be stored on the user's phone. The user's phone may be wired or wirelessly associated with the watch. In order to retrieve the token list from the phone, the watch may communicate with the phone. During the OTP generation process, the watch may communicate with the phone on two or more (or less) instances.

The communications between the watch and the phone may be communications that resemble a client-server relationship. The watch application may communicate as a client to the phone in order to retrieve the token list. The watch application may communicate, through a networking interface, with a companion application that is resident on the phone. Upon receipt of the communication at the phone, the phone launches the companion application. Once the companion application on the phone is launched, the companion application may access a third-party library. The third-party library may be used to retrieve the token list. The token list may be stored on secure storage. The token list may be stored in an encrypted manner in a secure enclave on the user's phone so that the token list cannot be hacked or tampered. Upon accessing the third-party library, the companion application retrieves the token list and transmits the token list to the smartwatch.

Once the retrieved token list is transmitted back to the smartwatch, the list may be stored in the watch's memory. It should be appreciated that the token list may not be stored anywhere on the smartwatch. Rather it may be only saved in memory while the OTP generation application is running on the smartwatch. Saving the token list in memory as opposed to storing the token list on the smartwatch may safeguard the token list. It may further secure the token list because the token list is not generally available on the watch.

The user may then select a token from the token list. Each account may be associated with one token. However, since a user may be associated with one or more accounts, the token list may include multiple tokens in the event that the user is associated with more than one account. One example of when a user may be associated with multiple accounts is when a user is an administrative user. In such circumstances, the user may have a regular, non-administrative account and an administrative account.

Figure 2:
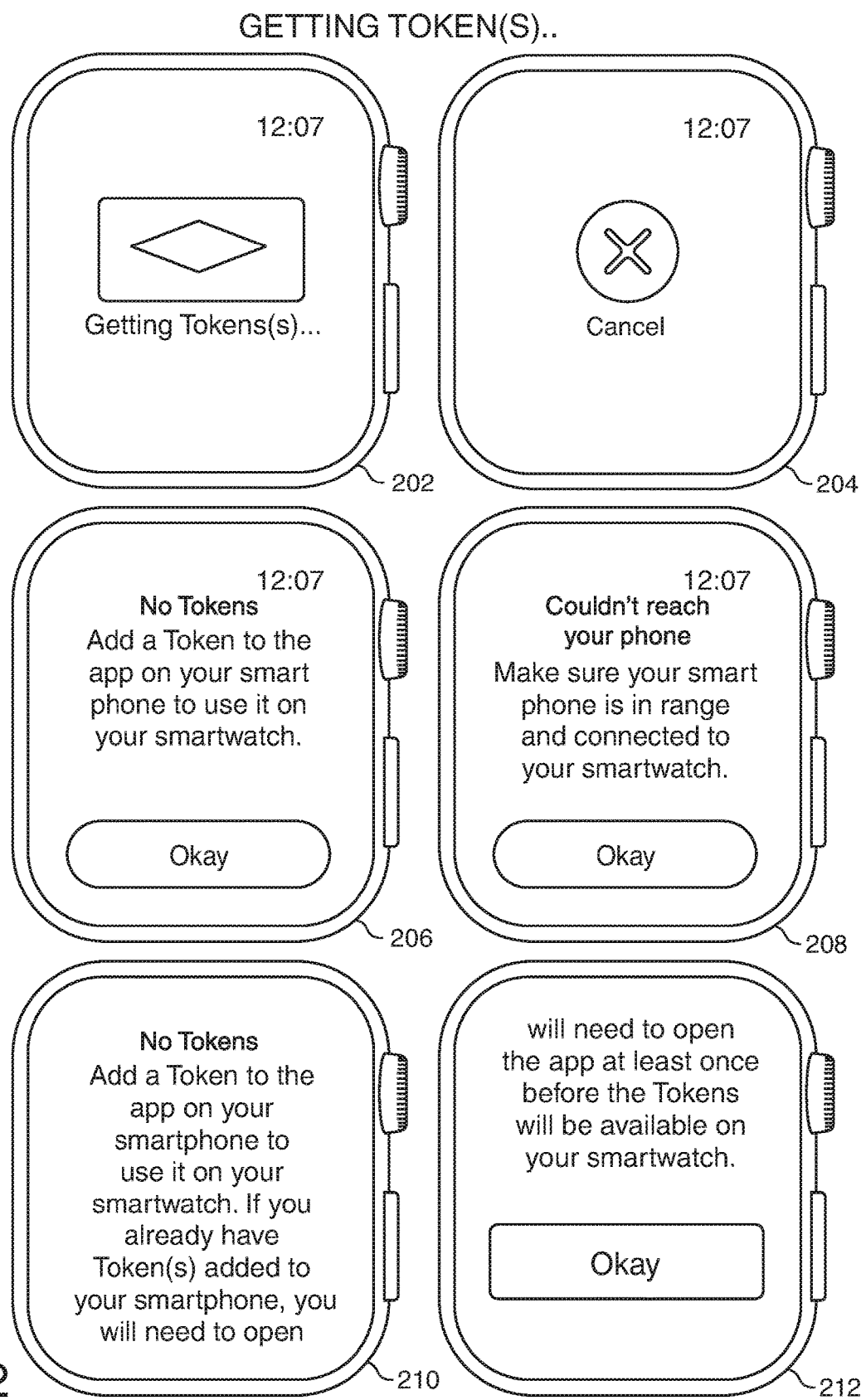
FIG. 2 shows illustrative smartwatch screens in accordance with principles of the disclosure.

FIG. 2 shows illustrative smartwatch screens. Smartwatch screen 202 shows a smartwatch communicating to retrieve the tokens. Smartwatch screen 202 may be shown when a smartwatch is retrieving tokens from memory within the smartwatch. Smartwatch screen 202 may be shown when a smartwatch is communicating with a smartphone to retrieve the tokens and/or token list. Smartwatch screen 202 may be shown before, or after, the smartwatch screen shown in FIG. 1.

Smartwatch screen 204 shows a cancel screen. If a user wants to terminate the getting token process, shown at 202, the user may select the cancel button, shown on screen 204.

Smartwatch screen 206 shows a no tokens screen. No tokens screen 206 may be displayed in the event that the smartwatch communicated with the companion application on the smartphone but was unable to locate a token on the smartphone. Smartwatch screen 206 may include a user selectable okay button. The user selectable okay button enables a user to acknowledge review of smartwatch screen 206.

Smartwatch screen 208 shows a couldn't reach your phone screen. Couldn't reach your phone screen 208 may be displayed in the event that the smartwatch was unable to communicate with the smartphone. Smartwatch screen 208 may include a user selectable okay button. The user selectable okay button enables a user to acknowledge review of smartwatch screen 208.

Smartwatch screens 210 and 212 shows another no token screen. Smartwatch screen 212 may be a continuation of smartwatch screen 210. A user may have to scroll from smartwatch screen 210 until smartwatch screen 212 to be able to view all of the text. The no token screen may indicate that a smartwatch user has requested a token or token list and the smartwatch communicated with the companion application on the smartphone. The smartphone may have been unable to retrieve a token or token list because there may have been no tokens added to the companion application on the smartphone. Smartwatch screen 212 may also include a user selectable okay button. The user selectable okay button enables a user to acknowledge review of smartwatch screens 210 and 212.

Figure 3:
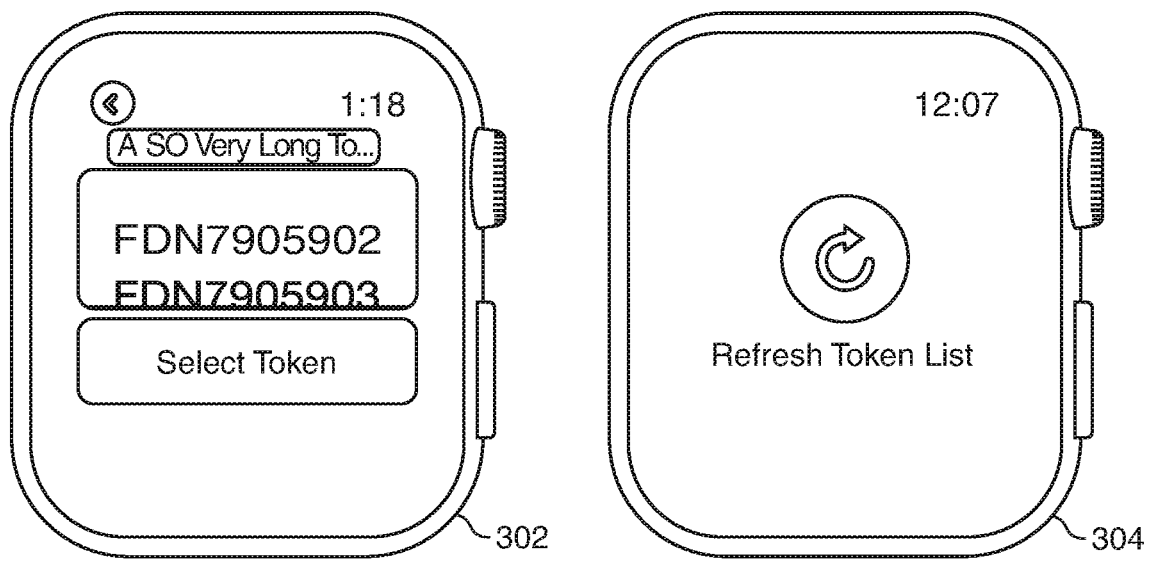
FIG. 3 shows illustrative smartwatch screens in accordance with principles of the disclosure.

FIG. 3 shows illustrative smartwatch screens associated with token selection.

Smartwatch token selection screen 302 may show a token. The name of the token may be "A So Very Long Token." The token name displayed in screen 302 may be based upon an arbitrary name for the token chosen by the user. The identification number associated with the token may be FDN7905902. The identification number may also be arbitrary, and may be associated with the token stored on the user's phone. Token selection screen 302 may include a select token button. The select token button may enable a user to select the token shown above the button. The select button may select the token currently selected within the list of tokens.

Smartwatch refresh token list screen 304 may show a refresh screen. Refresh screen 304 may enable a user to select refresh screen. Upon user selection, the smartwatch may proceed to refresh screen 402, shown in FIG. 4.

Figure 4:
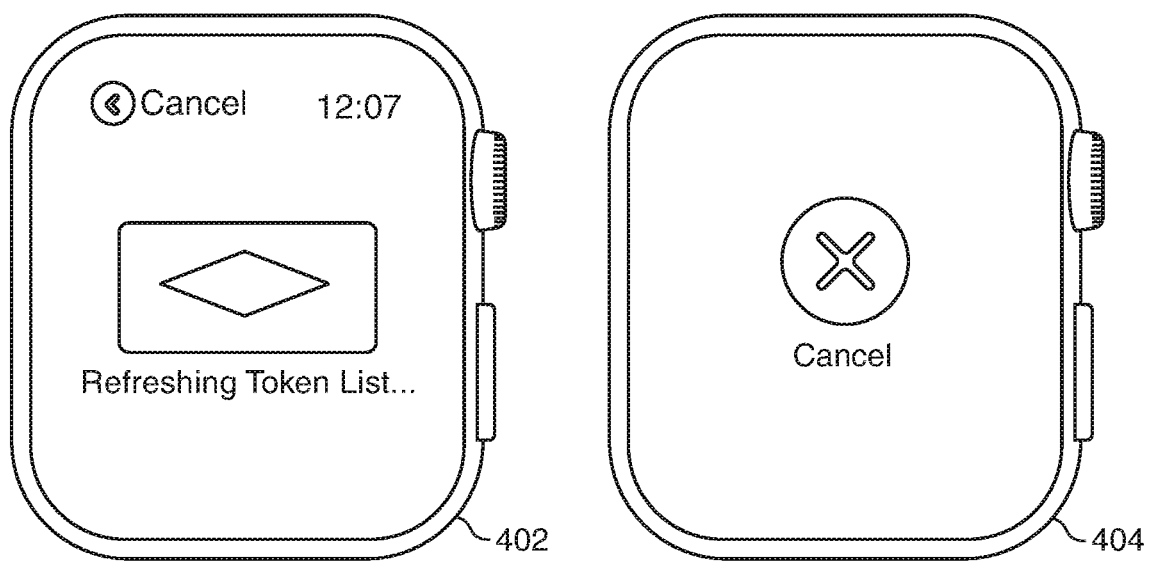
FIG. 4 shows illustrative smartwatch screens in accordance with principles of the disclosure.

FIG. 4 shows refresh token list screen 402 and cancel refresh screen 404. Refresh token list screen 402 may refresh the token list. Refreshing the token list may cause the smartwatch application to communicate with the smartphone application to retrieve the token list again. Retrieving the token list again may enable the smartwatch to retrieve the most recently available tokens. In some embodiments, the token list may expire after a predetermined time period. This may further secure the token list.

Cancel refresh screen 404 may enable a user to cancel the process of refreshing the token list.

Figure 5:
FIG. 5 shows illustrative smartwatch screens in accordance with principles of the disclosure.

FIG. 5 shows token action screen 502. Upon selection of a token, a user may be presented with a plurality of action options. The action options may include generate OTP and transaction signing. Each action option may be a user-selectable button. If a user selects generate OTP, a standard OTP may be generated. Exemplary embodiments of the use of standard OTPs may include use for approving a payment, use for approving a funds transfer, use for second factor of authentication, use for approving a file, use in accessing foreign exchange services, use in accessing a file and use in strong authentication at login.

If a user selects transaction signing OTP, a transaction signing OTP may be generated. A transaction signing OTP may require additional information to generate the unique transaction signing OTP. The additional pieces of information may include a numerical code, such as an eight-digit code and a control total, the total numerical amount of the transaction that the user would like to sign. The additional information may further harden the security associated with the transaction signing OTP.

FIG. 6 shows illustrative smartwatch screens associated with entry of the eight-digit code. Screen 602 may include an entry pad. The entry pad may include an instructional line. The instructional line may instruct the user what action to take. The instructions shown in screen 602 may be "Enter 8 digit code." Screen 602 may also include a numerical keypad. The numerical keypad may include number buttons and a backspace button.

Upon the initiation of user entry of an eight-digit code, the instruction line may be replaced with the user entered numbers, as shown in screen 604.

Upon entry of eight digits from the user, the smartwatch may display a submit button, as shown in screen 606. It should be appreciated that the submit button may only be available after the user has entered six digits.

Screen 608 shows a clear text button. In the event that the user wants to clear the text from the screen, the user may select the clear text button, shown in screen 608.

FIG. 7 shows illustrative screens associated with entry of a control total. The control total may be numerical total of the transaction that the user would like to sign.

Screen 702 may include an entry pad. The entry pad may include an instructional line. The instructional line may instruct the user what action to take. The instructions shown in screen 702 may be "Enter Control Total." Screen 702 may also include a numerical keypad. The numerical keypad may include number buttons and a backspace button.

Upon the initiation of user entry of a control total, the instruction line may be replaced with the user-entered numbers, as shown in screen 704.

Upon entry of eight digits from the user, the smartwatch may display a submit button, as shown in screens 704 and 706. The control total may be eight digits, or any other suitable number.

Screen 708 shows a clear text button. In the event that the user wants to clear the text from the screen, the user may select the clear text button, shown in screen 708.

Figure 8:
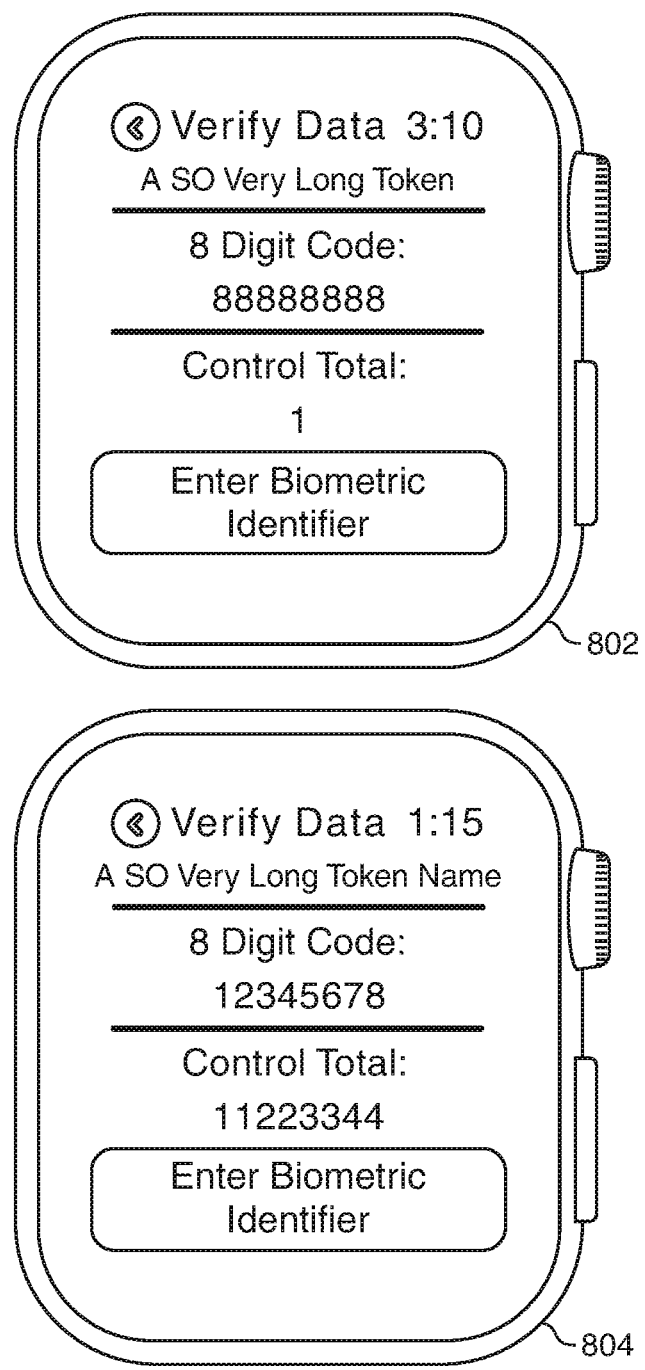
FIG. 8 shows illustrative smartwatch screens in accordance with principles of the disclosure.

FIG. 8 shows illustrative smartwatch screens associated with verifying data. Upon entry of an eight-digit code and a control total, the user may be required to enter a biometric identifier, as shown in verify data screens 802 and 804.

Figure 9:
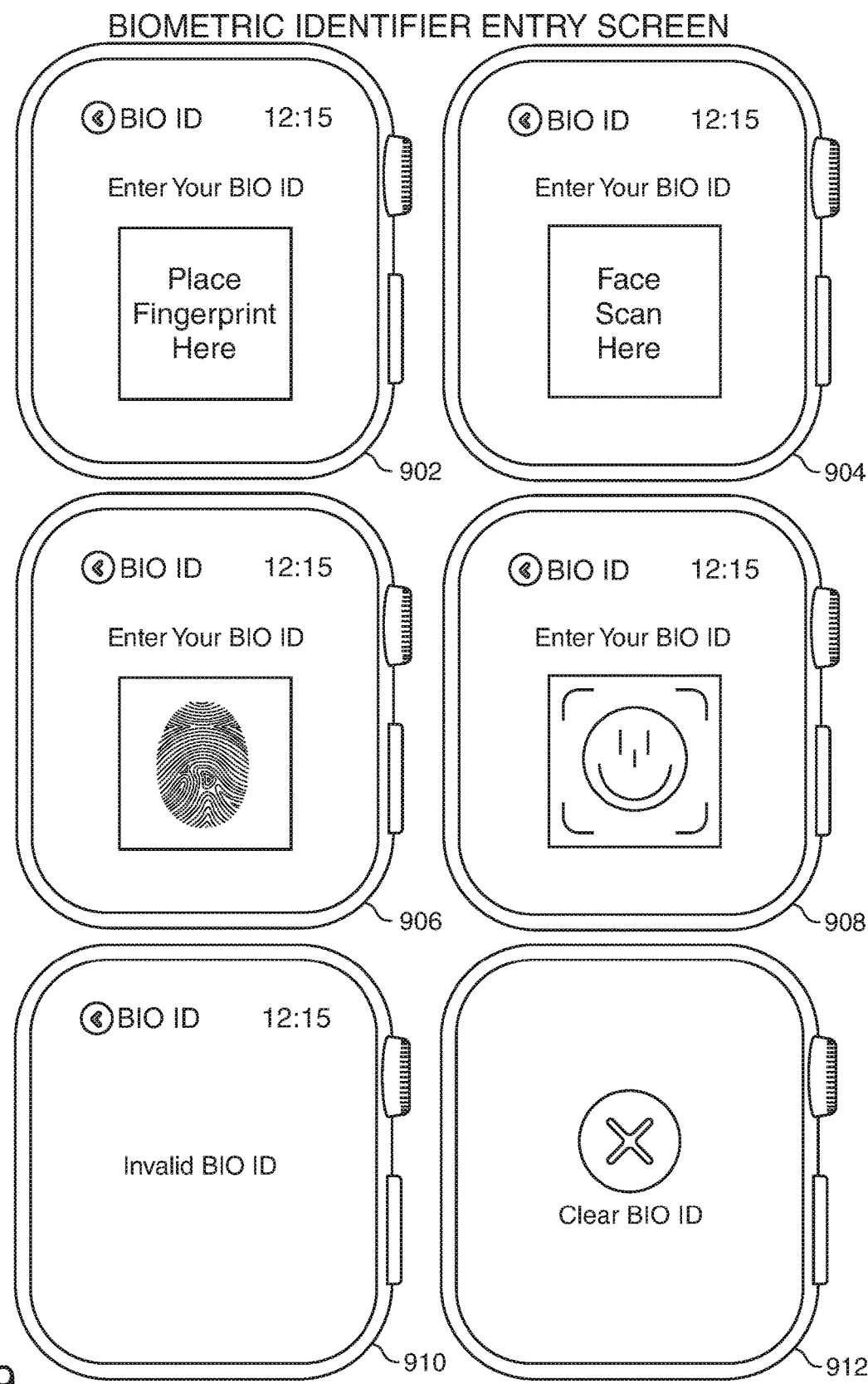
FIG. 9 shows illustrative smartwatch screens in accordance with principles of the disclosure.

FIG. 9 shows illustrative smartwatch screens associated with biometric identifier entry. It should be appreciated that biometric identifier entry may be associated with standard OTP generation and transaction signing OTP generation.

Screen 902 may include a biometric entry field. Above the entry field may be an instructional line. The instructional line may instruct the user what action to take. The instructions shown in screen 902 may be "Enter Your BIO ID." The biometric identifier entry field shown in screen 902 may be a fingerprint entry field.

Screen 904 may include also include a biometric entry field. Screen 904 may include a face scan entry field.

Screen 906 may show the watch display after the receipt of a fingerprint as a biometric identifier. Screen 908 may also show the watch display after the receipt of a face scan as a biometric identifier.

Screen 910 may include an invalid BIO ID screen. In the event that the biometric identifier is invalid the smartwatch may notify the user.

Screen 912 shows a clear BIO ID. In the event that the user wants to clear the BIO ID from the screen, the user may select the clear BIO ID button, shown in screen 912.

FIG. 10 shows illustrative smartwatch screens associate with validating a biometric identifier. Screen 1002 may show a screen that indicates that the smartwatch is communicating with the smartphone to validate the biometric identifier (and, in the case of the transaction signing OTP, the packaged eight-digit code, control total and biometric identifier).

Screen 1004 shows an error validating the biometric identifier. Error 9003 may be displayed because the tokens list was recently modified, and therefore, the biometric identifier was unable to be validated. Screen 1004 may also include a user selectable okay button. The user selectable okay button, when selected, may indicate that the user has reviewed the message displayed on screen 1004.

Screen 1006 shows another error validating the biometric identifier. The error shown in screen 1006 may indicate that the smartwatch is unable to communicate with the smartphone. Therefore, the smartwatch is unable to validate the biometric identifier.

Figure 11:
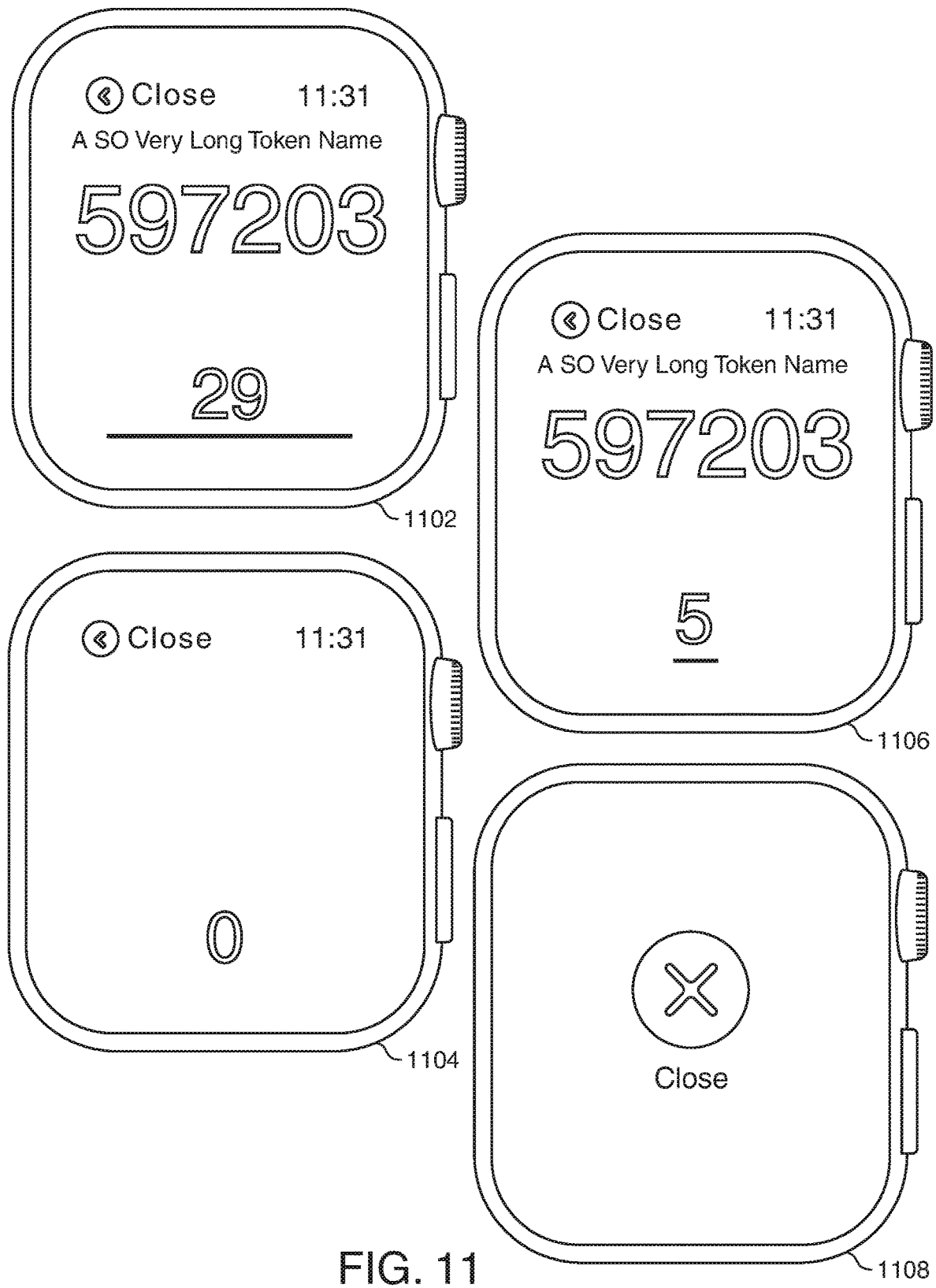
FIG. 11 shows illustrative smartwatch screens in accordance with principles of the disclosure.

FIG. 11 shows illustrative screens associated with an OTP timer screen. The OTP timer screens may display the OTP once it is received from the smartphone. The OTP timer screens may include the OTP and a countdown. The countdown may be a number of seconds until the OTP expires.

Screen 1102 shows the OTP and 29 seconds left until the OTP expires. Screen 1106 shows the OTP and 5 seconds left until the OTP expires. Screen 1104 shows no OTP because the countdown is down to zero seconds left, and because the OTP has expired, it is no longer available for viewing. Screen 1108 shows a close button. The close button enables the user to close the OTP timer screen.

Figure 12:
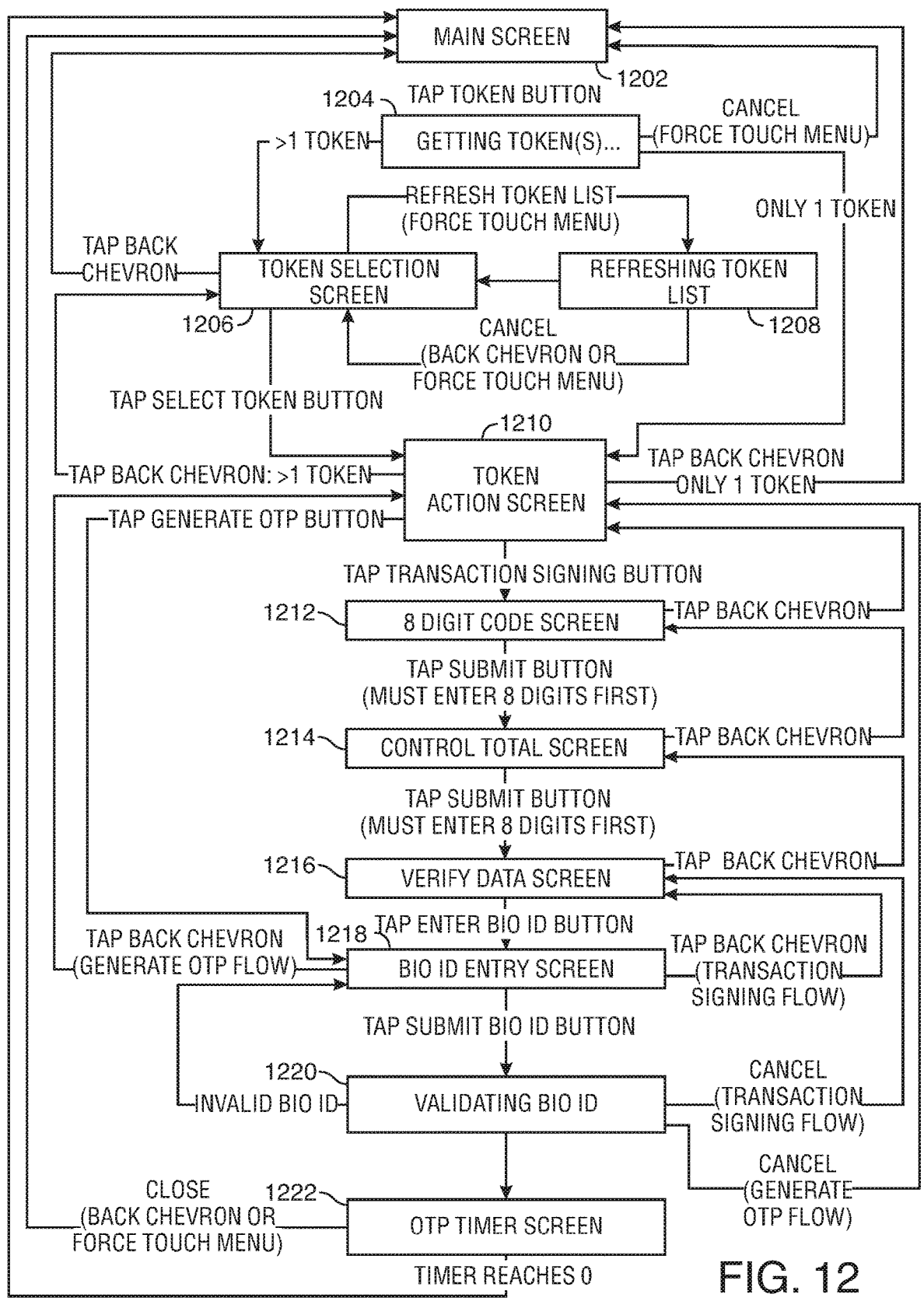
FIG. 12 shows an illustrative flow chart in accordance with principles of the disclosure.

FIG. 12 shows an illustrative flow chart. The illustrative flow chart may correspond to the illustrative screens shown in FIGS. 1-11.

Main screen 1202 may display a token button. Upon tapping the token button, a user may be directed to getting token(s) 1204.

If a user selects cancel within getting token(s) 1204, the user may be redirected to the main screen. If a user has only 1 token, the user may be directed to token action screen 1210. If a user has more than one token, the user may be directed to token selection screen 1206.

At token selection screen 1206, upon receipt of a tap back chevron by the user, the user may be directed to main screen 1202. At token selection screen 1206, upon receipt of a tap of the select token button, the user may be directed to token action screen 1210.

At token selection screen 1206, upon selection of refresh token list, the user may be directed to refreshing token list 1208. Upon completion of the refresh, the user may be directed to token selection screen 1206.

At refreshing token list 1208, the user may select a cancel button. Upon selection of the cancel button, the user may be directed to token selection screen 1206.

At token action screen 1210, if a user taps back, and there are multiple tokens in the token list, the user may be directed to token selection screen 1206. At token action screen 1210, if a user taps back, and there is only one token in the token list, the user may be directed to main screen 1202.

At token action screen 1210, if a user selects generate OTP button, in order to generate a standard OTP, the user is directed to BIO ID entry screen 1218. At token action screen 1210, if a user selects transaction signing, the user is directed to eight-digit code screen 1212.

At eight-digit code screen 1212, if a user taps back, the user is directed to token action screen 1210. If a user enters eight digits and taps submit, the user is directed to control total screen 1214.

At control total screen 1214, if a user taps back, the user is directed to eight-digit code screen 1212. If a user enters a control total and taps submit, the user is directed to verify data screen 1216.

At verify data screen 1216, if a user taps back, the user is directed to enter control total screen 1214. If a user taps enter BIO ID button, the user is directed to BIO ID entry screen 1218.

At BIO ID entry screen 1218, if a user taps back, the user may be directed to the previous screen. If the user had selected Generate OTP, the user may be taken back to token action screen 1210. If the user had selected transaction signing, the user may be taken back to verify data screen 1216.

At BIO ID entry screen 1218, upon entry of BIO ID and tapping of the submit BIO ID button, the user is directed to validating BIO ID screen 1220. At validating BIO ID screen 1220, the user may select cancel. If the user had selected generate OTP, the user may be directed back to token action screen 1210. If the user had selected transaction signing, the user may be directed back to verify data screen 1216. At validating BIO ID screen 1220, if the user enters an invalid BIO ID, the user may be redirected to the BIO ID entry screen 1218.

Upon a successful BIO ID validation, validating BIO ID screen 1220 directs the user to OTP timer screen 1222. OTP timer screen displays the OTP and countdown for a predetermined amount of time. Upon completion of the predetermined amount of time, when the countdown reaches zero or when the user selects the close button the user may be directed to main screen 1202.

FIG. 13 shows a list of error messages. Error messages 1302 may include session delegation errors, shown at 1304. Session delegation errors may include session not active; session has content pending; device not reachable and unknown session error.

Error messages 1302 may include token errors, shown at 1306. Token errors may include cannot generate OTP; cannot read phone data; BIO ID validation error; token list modified since last fetch; jailbroken smartphone; no passcode on watch and unknown token error.

Error messages 1302 may include WatchKit connectivity errors, shown at 1308. WatchKit connectivity errors may include reply messages took too long; payload cannot be delivered and device not reachable.

The errors shown in error messages 1302 may halt a user from accessing the OTP generation application and generating and/or displaying an OTP.

Figure 14:
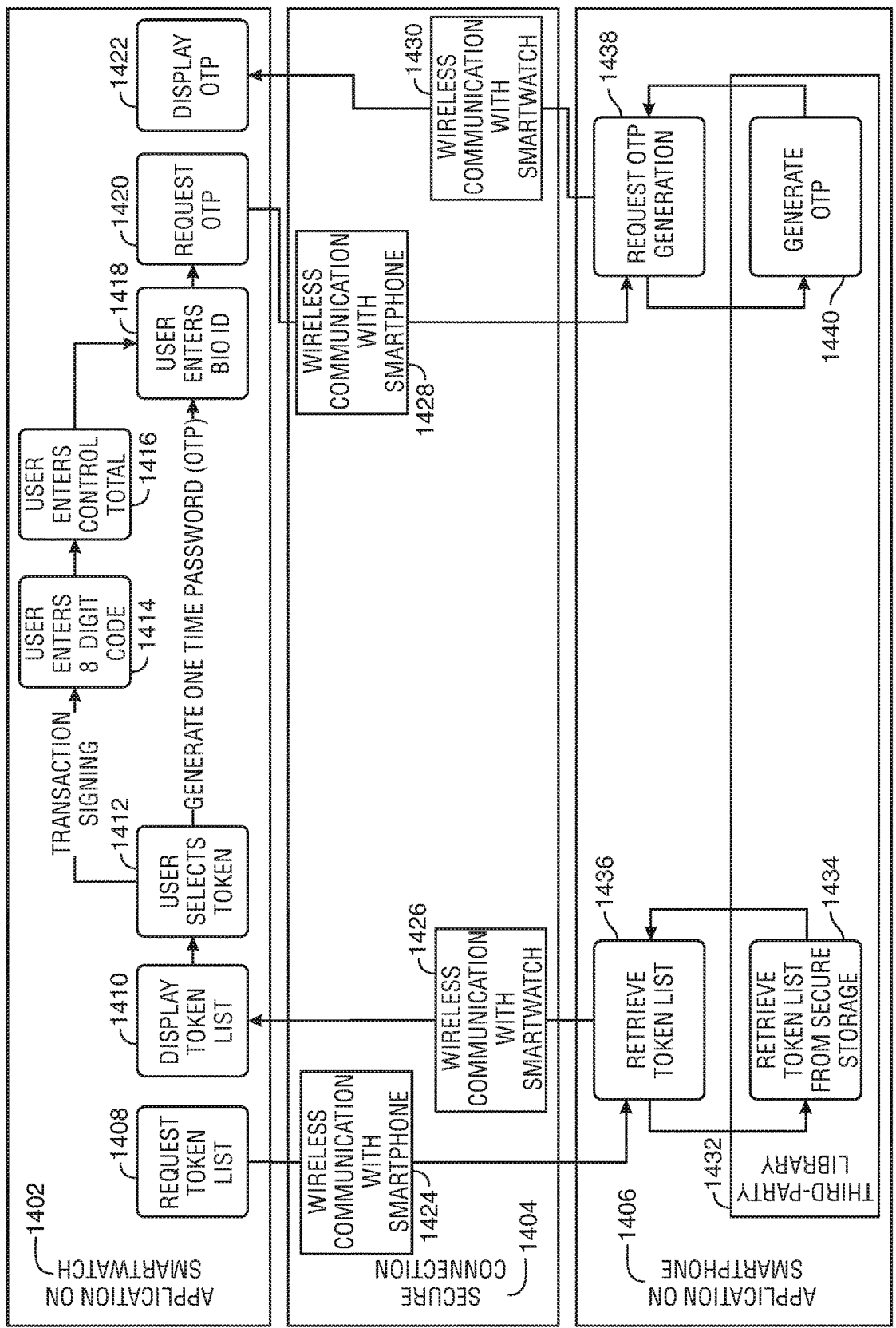
FIG. 14 shows an illustrative flow chart in accordance with principles of the disclosure.

FIG. 14 shows an illustrative flow chart. Swim lane 1402 corresponds to an application on a smartwatch. Swim lane 1404 corresponds to the secure connection between the application on the smartwatch and the application on the smartphone. Swim lane 1406 corresponds to the application on the smartphone.

The secure connection may be a wireless connection. The secure connection may be BLUETOOTH® communications. The secure connection may be WI-FI® communications. WI-FI® communications may be used when the smartwatch and the smartphone are operating on the same WI-FI® network and are not reachable via BLUETOOTH®.

The smartwatch application may request a token list, as shown at 1408. The request for a token list may be communicated wirelessly and securely, as shown at 1424, to the smartphone application, as shown at 1436.

The smartphone application may tap into the third-party library to retrieve the token list from secure storage, as shown at 1434. The smartphone application may transmit the token list wirelessly and securely, as shown at 1426, to the smartwatch application.

The smartwatch application may display the token list, as shown at 1410. A user may select a token from the token list, as shown at 1412. Upon selection of a token from the token list, the user may either select standard OTP generation or transaction signing OTP.

If the user selects standard OTP generation, the user may be prompted to enter a BIO ID, as shown at 1418. If the user selects transaction signing, the user may be prompted to enter an eight-digit code, as shown at 1414. Upon entry of the eight-digit code, the user may be prompted to enter a control total, as shown at 1416. Upon entry of a control total, the user may be prompted to enter a BIO ID, as shown at 1418.

Upon entry of a BIO ID, smartwatch application may request an OTP, as shown at 1420. Smartwatch application request for an OTP may be communicated wirelessly and securely, as shown at 1428. Smartphone application handles OTP generation request from smartphone application, shown at 1438. Smartphone application may tap into third-party code library 1432 to generate an OTP, as shown at 1440. Smartphone application may communicate the generated OTP via communication 1430 to smartwatch application. Smartwatch application may display the OTP, as shown at 1422.

Thus, smartwatch OTP generation is provided. Persons skilled in the art will appreciate that the present invention can be practiced by other than the described embodiments, which are presented for purposes of illustration rather than of limitation.

What is claimed is:

1. A method for generating a one-time password ("OTP") on a smartwatch, the smartwatch being in communication with a smartphone, the method comprising:
   generating a request for a token list at a smartwatch application, said smartwatch application being associated with the smartwatch;
   transmitting the request for the token list over a secure wireless communication to a smartphone application, said smartphone application being associated with the smartphone;
   receiving the request for the token list at the smartphone application;
   using a third-party library, stored within the smartphone application, to retrieve the token list from secure storage on the smartphone;
   transmitting the token list from the smartphone application via the secure wireless communication to the smartwatch application;
   displaying the token list on the smartwatch;
   receiving, at the smartwatch application, a user selection of a token from the token list;
   requesting, at the smartwatch application, entry of a biometric identifier;
   upon receipt of the biometric identifier at the smartwatch application, transmitting an OTP request over the secure wireless communication to the smartphone application;
   receiving the OTP request at the smartphone application;
   accessing the third-party library;
   generating the OTP within the third-party library located within the smartphone application;
   transmitting the generated OTP, via the secure wireless communication, from the smartphone application to the smartwatch application; and
   displaying the generated OTP on the smartwatch.

2. The method of claim 1, wherein the biometric identifier is a fingerprint.

3. The method of claim 1, wherein the biometric identifier is a face.

4. The method of claim 1, wherein a countdown until OTP expiration considers a transmission delay between the smartphone and the smartwatch.

5. The method of claim 1, wherein a countdown until OTP expiration includes transmission delay and a static number of seconds.

6. The method of claim 1, wherein the OTP expires after a predetermined amount of time after generation at the third-party library.

7. The method of claim 1, wherein the smartwatch displays a countdown of a number of seconds until the OTP will expire.

8. A method for generating a one-time password ("OTP") on a smartwatch, the smartwatch being in communication with a smartphone, the method comprising:
   generating a request for a token list at a smartwatch application, said smartwatch application being resident on the smartwatch;
   transmitting the request for the token list over a secure wireless communication to a smartphone application, said smartphone application being resident on the smartphone;
   receiving the request for the token list at the smartphone application;
   using a third-party library, stored within the smartphone application, to retrieve the token list from secure storage on the smartphone;
   transmitting the token list from the smartphone application via the secure wireless communication to the smartwatch application;
   displaying the token list on the smartwatch;
   receiving, at the smartwatch application, a user selection of a token from the token list;
   requesting, at the smartwatch application, entry of a biometric identifier;
   upon receipt of the biometric identifier at the smartwatch application, transmitting an OTP request over the secure wireless communication to the smartphone application;
   receiving the OTP request at the smartphone application;
   accessing the third-party library;
   generating the OTP within the third-party library located within the smartphone application;
   transmitting the generated OTP, via the secure wireless communication, from the smartphone application to the smartwatch application; and
   displaying the generated OTP on the smartwatch.

9. The method of claim 8, wherein the OTP expires after a predetermined amount of time after generation at the third-party library.

10. The method of claim 8, wherein the smartwatch displays a countdown of a number of seconds until the OTP will expire.

11. The method of claim 8, wherein a countdown until OTP expiration considers a transmission delay between the smartphone and the smartwatch.

12. The method of claim 8, wherein a countdown until OTP expiration includes transmission delay and a static number of seconds.

13. The method of claim 8, wherein the secure wireless communication is Bluetooth® communication.

14. The method of claim 8, wherein the secure wireless communication is WI-FI® communication.

15. A method for generating a transaction signing one-time password ("OTP") on a smartwatch, the smartwatch being in communication with a smartphone, the method comprising:

generating a request for a token list at a smartwatch application, said smartwatch application being associated with the smartwatch;

transmitting the request for the token list over a secure wireless communication to a smartphone application, said smartphone application being associated with the smartphone;

receiving the request for the token list at the smartphone application;

using a third-party library to retrieve the token list stored on secure storage on the smartphone;

transmitting the token list from the smartphone application via the secure wireless communication to the smartwatch application;

displaying the token list on the smartwatch;

receiving, at the smartwatch application, a user selection of a token from the token list;

requesting, at the smartwatch application, entry of a secure entry code;

requesting, at the smartwatch application, entry of a control total;

requesting, at the smartwatch application, entry of a biometric identifier;

upon receipt of the secure entry code, control total and biometric identifier at the smartwatch application, packaging the secure entry code, control total and biometric identifier into a packaged transaction signing OTP request;

transmitting the transaction signing OTP request over the secure wireless communication to the smartphone application;

receiving the transaction signing OTP request at the smartphone application;

accessing the third-party library located on secure storage;

generating the transaction signing OTP within the third-party library located within the smartphone application;

transmitting the generated transaction signing OTP, via the secure wireless communication, from the smartphone application to the smartwatch application; and displaying the generated transaction signing OTP on the smartwatch.

16. The method of claim 15, wherein the transaction signing OTP expires after a predetermined amount of time after generation at the third-party library.

17. The method of claim 15, wherein the smartwatch displays a countdown of a number of seconds until the transaction signing OTP will expire.

18. The method of claim 15, wherein a countdown until transaction signing OTP expiration considers a transmission delay between the smartphone and the smartwatch.

19. The method of claim 15, wherein a countdown until transaction signing OTP expiration includes transmission delay and a static number of seconds.

20. The method of claim 15, wherein the secure wireless communication is BLUETOOTH® communication.

21. The method of claim 15, wherein the secure wireless communication is Wi-Fi® communication.

* * * * *